(12) United States Patent
Nara et al.

(10) Patent No.: US 8,103,699 B2
(45) Date of Patent: Jan. 24, 2012

(54) CONTENTS REORDERING IN A CONTENTS REPRODUCTION APPARATUS

(75) Inventors: Hitoshi Nara, Chiba (JP); Takashi Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 11/772,429

(22) Filed: Jul. 2, 2007

(65) Prior Publication Data

US 2008/0168084 A1    Jul. 10, 2008

(30) Foreign Application Priority Data

Jul. 11, 2006  (JP) ................................. 2006-190562

(51) Int. Cl.
*G06F 17/30* (2006.01)
(52) U.S. Cl. ........................................................ 707/803
(58) Field of Classification Search ........................ None
See application file for complete search history.

(56) References Cited

U.S. PATENT DOCUMENTS

| | | | | |
|---|---|---|---|---|
| 6,208,999 | B1 * | 3/2001 | Spilo et al. ............................ | 1/1 |
| 6,441,832 | B1 * | 8/2002 | Tao et al. ....................... | 715/723 |
| 7,062,338 | B1 * | 6/2006 | Auflick et al. .................. | 700/94 |
| 2005/0262084 | A1 * | 11/2005 | Tomita .............................. | 707/9 |
| 2005/0278336 | A1 * | 12/2005 | Ito ..................................... | 707/9 |
| 2006/0004685 | A1 * | 1/2006 | Pyhalammi et al. .............. | 707/1 |
| 2006/0288167 | A1 * | 12/2006 | Gong ............................. | 711/115 |
| 2007/0050396 | A1 * | 3/2007 | Cheng et al. ................... | 707/102 |
| 2007/0124796 | A1 * | 5/2007 | Wittkotter ...................... | 725/136 |

FOREIGN PATENT DOCUMENTS

| JP | 2003059238 A | * | 2/2003 |
|---|---|---|---|
| JP | 2004-30116 | | 1/2004 |

* cited by examiner

*Primary Examiner* — Charles Rones
*Assistant Examiner* — Yuk Ting Choi
(74) *Attorney, Agent, or Firm* — Oblon, Spivak, McClelland, Maier & Neustadt, L.L.P.

(57) ABSTRACT

The present invention provides a contents reproduction apparatus which includes a file identifier generation unit that generates file identifiers that uniquely determine a plurality of contents files respectively which are hierarchically stored in an external storage device, an identification information generation unit that generates identification information to identify the respective contents files based on part of additional data related to the contents files and the file identifiers, a list forming unit that forms a list by re-arraying the identification information with the part of additional data set as the re-array condition, and a reproduction unit that reads out and reproduces the contents files which are identified by the file identifiers of the respective identification information from the external storage device in accordance with the order of the identification information in the list.

19 Claims, 9 Drawing Sheets

| TITLE | TOMORROW |
|---|---|
| ARTIST NAME | BEAGLES |
| ALBUM NAME | HOPE! |

FL1

| TITLE | I WANT FOR CHRISTMAS |
|---|---|
| ARTIST NAME | MARIAH CURRY |
| ALBUM NAME | THE HITS |

FL2

| TITLE | LAST LOVE |
|---|---|
| ARTIST NAME | OTADA HIKARI |
| ALBUM NAME | |

FL3

| TITLE | VIP STAR |
|---|---|
| ARTIST NAME | HIRATA KEN |
| ALBUM NAME | UTABAKO |

FL4

| TITLE | |
|---|---|
| ARTIST NAME | AMASAKI ASAMI |
| ALBUM NAME | VOUGE |

FL5

| TITLE | WE ARE CHAMPIONS |
|---|---|
| ARTIST NAME | |
| ALBUM NAME | JEWELRY |

LST2

| 0005 | AMAS |
|------|------|
| 0001 | BEAG |
| 0004 | HIRA |
| 0002 | MARI |
| 0003 | OTAD |
| 0006 |      |

FIG. 6A

LST3

| 0001 | HOPE |
|------|------|
| 0006 | JEWE |
| 0002 | THE  |
| 0004 | UTAB |
| 0005 | VOGU |
| 0003 |      |

FIG. 6B

CONTENTS REORDERING IN A CONTENTS REPRODUCTION APPARATUS

CROSS REFERENCES TO RELATED APPLICATIONS

The present invention contains subject matter related to Japanese Patent Application JP2006-190562 filed in the Japanese Patent Office on Jul. 11, 2006, the entire contents of which being incorporated herein by reference.

BACKGROUND OF THE INVENTION

1. Field of the Invention

This invention relates to a contents reproduction apparatus, a contents reproduction method, and a contents reproduction program, which are desirably employed in, for example, an audio reproduction apparatus that reproduces music contents stored in an external memory.

2. Description of the Related Art

There are being diffused audio reproduction apparatuses which, in addition to reading out and reproducing music contents stored in a storage medium such as a music Compact Disc (CD), read out and reproduce contents files being music contents of a Motion Picture Expert Group-1 Layer-3 (MP3) format etc. written in a Compact Disc-Recordable (CD-R) using a personal computer etc. by a user.

Among audio reproduction apparatuses, there are some which are provided with a Universal Serial Bus (USB) interface, and read out and reproduce contents files from a flash memory of a USB connection type (that is, USB memory) which is used as an external storage medium for a personal computer.

Especially, in recent years, there are suggested portable audio reproduction apparatuses which have loaded therein a small-sized hard disc drive, a large capacity flash memory, etc. and can store contents files of, for example, several hundreds to several thousands pieces of music.

Audio reproduction apparatuses are configured such that, in case such a portable audio reproduction apparatus is connected through the USB interface, dealing with the portable audio reproduction apparatus as a mere storage medium similar to a USB memory, contents files stored in the portable audio reproduction apparatus can be read out to be reproduced.

It is considered that the convenience is enhanced in case an audio reproduction apparatus forms a contents list in which all the contents files are re-arrayed depending on the title names or artist names to make it possible to sequentially reproduce music contents in the order of the title names or artist names in accordance with the order on the contents list.

Among above-described portable audio reproduction apparatuses, there are some which, in case contents files are transferred from a personal computer, form a contents management file that entirely manages the title names, artist names, or file names of the respective contents files, and display the list of the contents files using the contents management file.

In case an audio reproduction apparatus can utilize the contents management file, a contents list can be easily formed.

However, the configuration or management format of the contents management file is variously different depending on the manufacturer, kind, etc. of portable audio reproduction apparatuses. Accordingly, actually, audio reproduction apparatuses are not able to utilize the contents management file.

That is, in order to form a contents list, it is necessary for an audio reproduction apparatus to find out what kinds of contents files are stored in a connected storage medium.

As a method to search for files in a storage medium, there has been suggested an information reproduction display apparatus that forms a management table for files which are distributed to folders of the hierarchical structure to be recorded in a recording medium, and displays the file names for the respective folders (for example, Jpn. Pat. Appln. Laid-Open Publication No. 2004-30116 [FIG. 4]).

SUMMARY OF THE INVENTION

However, so as to form a management table (that is, contents list), as is performed by such an information reproduction display apparatus, it is necessary to prepare a memory capacity to store read out file names etc.

Accordingly, there is a problem that, in case the memory capacity of an audio reproduction apparatus is insufficient with respect to the total number (for example, approximately a thousand pieces of music) of contents files, since the file names etc. of all the contents files are unable to be stored in a memory, a contents list is unable to be formed.

It is therefore desirable to overcome the above-mentioned drawbacks by providing a contents reproduction apparatus, a contents reproduction method, and a contents reproduction program which can re-array and reproduce contents with a slight memory capacity.

According to an embodiment of the present invention, there is provided a contents reproduction apparatus, which generates file identifiers that uniquely determine a plurality of contents files respectively which are hierarchically stored in an external storage device; generates identification information to identify the respective contents files based on part of additional data related to the contents files and the file identifiers; forms a list by re-arraying the identification information with the part of additional data set as the re-array condition; and reads out and reproduces the contents files which are identified by the file identifiers of the respective identification information from the external storage device in accordance with the order of the identification information in the list.

By representing the contents files using the identification information which is obtained by combining the file identifiers and part of additional data, the data size of identification information which represents a single contents file can be reduced, which can make it possible to form the list in which the identification information is re-arrayed based on the additional data using a slight memory capacity.

According to an embodiment of the present invention, by representing the contents files using the identification information which is obtained by combining the file identifiers and part of additional data, the list in which the identification information is re-arrayed based on the additional data can be formed with the data size of identification information which represents a single contents file reduced, which can realize a contents reproduction apparatus, a contents reproduction method, and a contents reproduction program capable of re-arraying and reproducing contents using a slight memory capacity.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIG. 4 shows a schematic view to explain the tag data of contents files;

FIG. 6A and FIG. 6B show schematic views indicative of the configuration of list files (2);

DETAILED DESCRIPTION OF THE PREFERRED EMBODIMENTS

Referring to the accompanying drawings, an embodiment of the present invention will further be described below.

(1) Configuration of Audio Reproduction Apparatus

Figure 1:
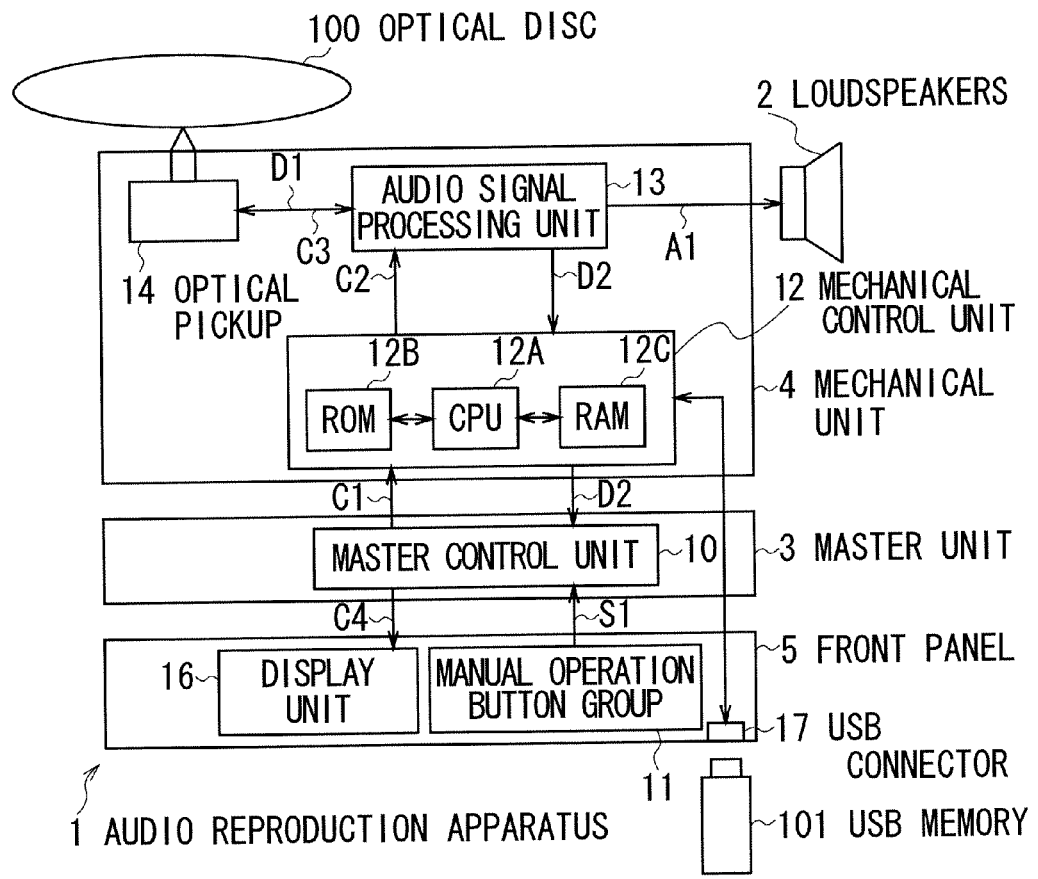
FIG. 1 shows a block diagram indicative of the configuration of an audio reproduction apparatus.

FIG. 1 shows a block diagram indicative of an entire configuration of an audio reproduction apparatus 1, which works as a car audio apparatus loaded on a vehicle, not shown. The audio reproduction apparatus 1 reproduces data recorded on an optical disc 100 such as a CD or receives radio signals based on the operation of a user, and converts resulting reproduced audio signals to sounds using loudspeakers 2 to output the sounds.

The audio reproduction apparatus 1 includes, as a whole, a master unit 3 that controls the entire apparatus, a mechanical unit 4 that controls a sound source device such as an optical disc drive or a radio tuner to generate audio signals, and a front panel 5 that functions as a user interface.

Figure 2:
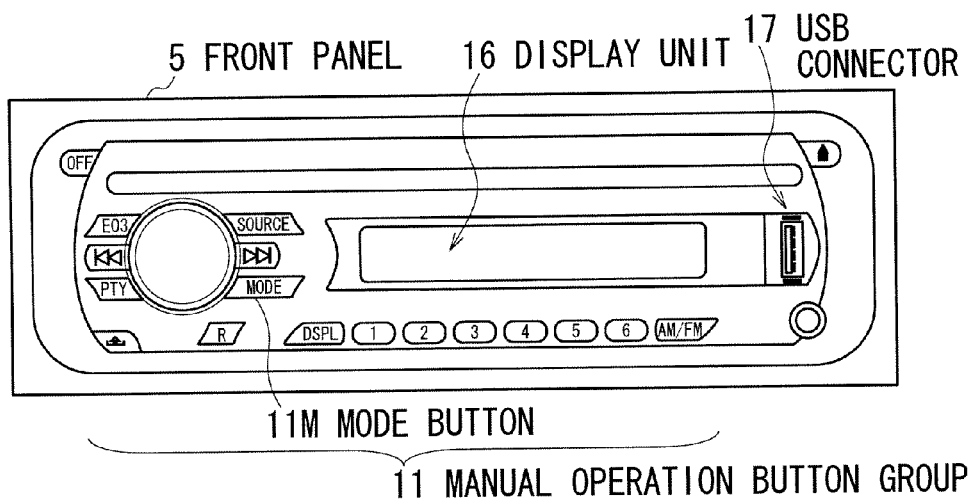
FIG. 2 shows a schematic view indicative of the configuration of a front panel.

The master unit 3 includes a master control unit 10 that overall controls the audio reproduction apparatus 1. When a manual operation button group 11 arranged on the front panel 5 shown in FIG. 2 is operated by a user, the master control unit 10 takes in an operation signal S1 based on the operation contents to perform predetermined operation acceptance processing, and generates a control signal C1 according to the result of the operation acceptance processing, and then sends the control signal C1 to a mechanical control unit 12 of the mechanical unit 4.

The mechanical control unit 12 overall controls the mechanical unit 4. The mechanical control unit 12 is a built-in microcomputer, and includes a Central Processing Unit (CPU) 12A as the central unit, and further includes a Read Only Memory (ROM) 12B of 384 kB which has stored therein various programs and a Random Access Memory (RAM) 12C of 24 kB which is used as the work area etc. of the CPU 12A.

Actually, the mechanical control unit 12 generates a control signal C2 based on the control signal C1 taken in from the master control unit 10, and supplies thus generated control signal C2 to an audio signal processing unit 13.

In case the control signal C2 is the designation to read out music contents from the optical disc 100, the audio signal processing unit 13 supplies a servo control signal C3 to an optical pickup 14 to servo-control the optical pickup 14.

Accordingly, the audio signal processing unit 13 takes in readout data D1 which is read out from the optical disc 100 from the optical pickup 14, and performs predetermined demodulation processing or decode processing for the readout data D1 to generate an audio signal A1. Furthermore, the audio signal processing unit 13 amplifies the audio signal A1 using an amplifier, not shown, to send thus amplified signal to the loudspeakers 2, thereby converting the audio signal A1 to sounds to make a user listen to the sounds.

The audio reproduction apparatus 1 corresponds not only to a music CD that has stored therein music contents in the uncompressed state but also to a CD-R (referred to as data CD, hereinafter) that has stored therein music contents as contents files of the MP3 format. In this case, the audio reproduction apparatus 1 generates the audio signal A1 by reading out the readout data D1 being a contents file using the optical pickup 14, and expanding the readout data D1 in the audio signal processing unit 13.

Furthermore, the audio signal processing unit 13 generates contents information D2 composed of a reproduction time period, a title name, etc. of the contents file based on the readout data D1, and sends thus generated contents information D2 to the mechanical control unit 12. The mechanical control unit 12 transfers the contents information D2 to the master control unit 10.

The master control unit 10 generates a display control signal C4 based on the contents information D2, and sends thus generated display control signal C4 to a display unit 16 of the front panel 5, thereby making the display unit 16 display the display contents based on the contents information D2.

Furthermore, the front panel 5 shown in FIG. 2 is provided with a USB connector 17, to which a USB memory 101 as an external storage device which has built therein a flash memory and loaded therein the USB interface can be connected.

Actually, in the audio reproduction apparatus 1, when the USB memory 101 is connected to the USB connector 17, the mechanical control unit 12 recognizes that the USB memory 101 is connected, and reads out a contents file stored in the USB memory 101 as readout data D3 to supply thus read out readout data D3 to the audio signal processing unit 13 (details of which will be explained later).

Then, similar to the case in which the readout data D1 being a contents file of the MP3 format is read out from the optical disc 100, the audio signal processing unit 13 expands the readout data D3 to generate the audio signal A1.

In this way, based on the operation of the user, the audio reproduction apparatus 1 can reproduce contents files read out from the optical disc 100 or USB memory 101.

(2) Ordering Files

Similar to a general storage medium of a personal computer, the USB memory 101 has stored therein data such as contents files with a file set as unit, and the respective files are arbitrarily distributed to be arranged in a plurality of hierarchically structured (tree-structured) folders.

For example, it is assumed that, in the USB memory 101, folders to which artist names or album names are appended by a user are arbitrarily formed, and respective contents files are distributed to the respective folders according to their artist names or album names.

Furthermore, in the USB memory 101, similar to a general storage medium, all the contents files and folders in the USB memory 101 are managed with a file set as unit using the FAT (File Allocation Table).

Figure 3:
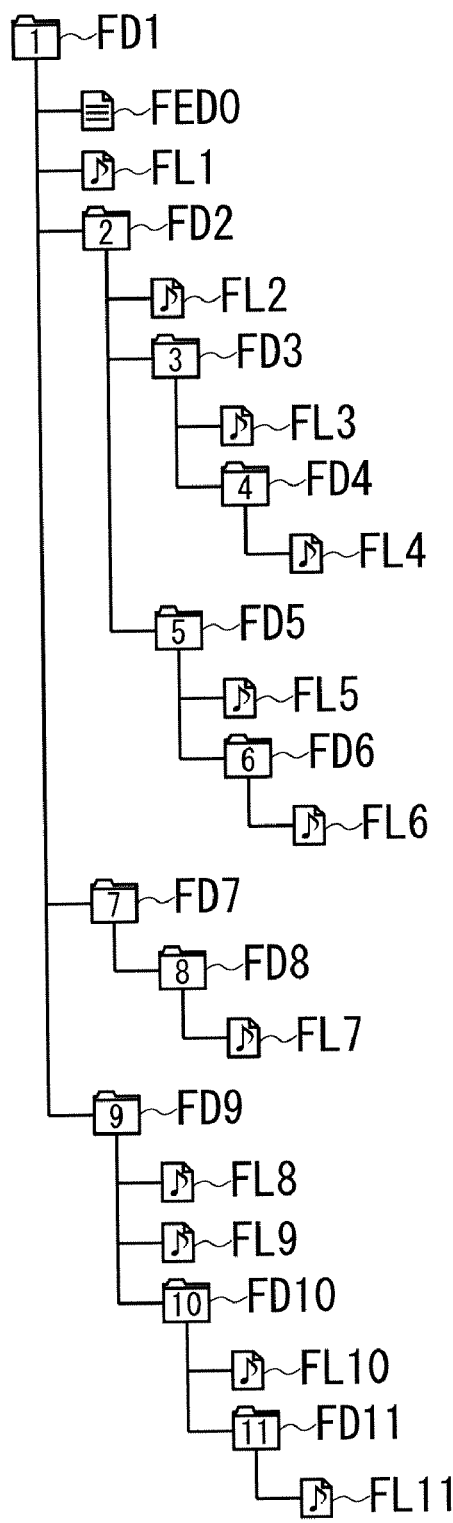
FIG. 3 shows a schematic view indicative of an example of the folder configuration.

For example, in the USB memory 101, as shown in FIG. 3 as an example, it is assumed that a hierarchical structure composed of a folder FD1 being a root folder and a plurality of folders FD2 to FD11 is formed, and contents files FL1 to FL11 are arranged in the respective folders FD1 to FD11. Moreover, it is assumed that FAT entry data FED0 is arranged in the root folder FD1.

Actually, when it is recognized that the USB memory 101 is connected to the USB connector 17, the mechanical control unit 12 of the audio reproduction apparatus 1 shown in FIG. 1 recognizes the hierarchical structure of the folders and the folders to which the respective contents files belong shown in FIG. 3 by firstly reading out the FAT entry data FED0, and then analyzing information related to the folders FD.

The mechanical control unit 12 is so configured as to differentiate contents files composed of music contents from other files based on extensions of the respective files, and recognize only the contents files.

Subsequently, the mechanical control unit 12 is so configured as to access the respective contents files in a unique order by assigning orders conforming to a predetermined ordering rule to the respective hierarchically arranged contents files.

Specifically, the mechanical control unit 12 firstly retrieves the contents files FL and folders FD arranged in the root folder FD1 based on the registration contents of the FAT entry data FED0, and then consequently recognizes the FAT entry data FED0, contents file FL1, folders FD2, FD7, and FD9. The mechanical control unit 12 sets the recognized contents file FL1 to the "first file".

In case a plurality of contents files FL are arranged in the identical folder FD, the mechanical control unit 12 sequentially recognizes the respective files FL in accordance with the order registered in the FAT entry data FED0. Furthermore, with respect to a plurality of folders FD arranged in the identical folder FD, similarly, the mechanical control unit 12 sequentially recognizes the respective folders FD in accordance with the order registered in the FAT entry data FED0.

Next, among the folders FD2, FD7, and FD9, which are arranged in the lower hierarchy of the root folder FD1, the mechanical control unit 12 pays notice to the folder FD2 that is firstly recognized in accordance with the registration order of the FAT entry data FED0, and retrieves contents files and folders arranged in the folder FD2, and then consequently recognizes the file FL2, folders FD3 and FD5. The mechanical control unit 12 sets the recognized contents file FL2 to the "second file" following the previously recognized contents file FL1.

In case no folder FD of the lower hierarchy is arranged in the noticed folder FD (for example, folder FD4), the mechanical control unit 12 sequentially switches the noticed folder FD to that of the upper hierarchy, and, in a folder FD (for example, folder FD2) in which a plurality of folders FD are arranged, sets a next folder FD (for example, folder FD5) following the previously noticed folder FD (for example, folder FD3) to a folder FD to which notice is to be newly paid based on the registration order of the FAT entry data FED0.

Afterward, sequentially switching the noticed folder FD, the mechanical control unit 12 repeats a series of processing of retrieving and ordering the contents files FL directly arranged in the noticed folder FD.

As a result, the mechanical control unit 12 orders the respective contents files FL in the order of the contents files FL1 to FL11, as shown in FIG. 3 (hereinafter, this ordering processing is referred to as hierarchy cyclic processing, and thus assigned order is referred to as hierarchy cyclic order).

At this time, in principle of the hierarchy cyclic processing in the tree structure, the mechanical control unit 12 can uniquely order the respective contents files FL by performing the hierarchy cyclic processing. That is, every time the hierarchy cyclic processing is performed, the mechanical control unit 12 can perform the identical ordering for the respective contents files FL each time.

In this way, in accessing the contents files FL of the USB memory 101, the mechanical control unit 12 of the audio reproduction apparatus 1 carries out the hierarchy cyclic processing based on the FAT entry data FED0, and identifies the respective contents files FL based on the order (hierarchy cyclic order) under which the respective contents files FL are recognized.

(3) Reproducing Contents Files Using List File (3-1) Forming List File

When the USB memory 101 is connected, the mechanical control unit 12 of the audio reproduction apparatus 1 forms a list file in which respective music contents are re-arrayed with titles, artist names, or album names of the contents files FL stored in the USB memory 101 set as the re-array conditions.

For the sake of convenience in explanation, it is assumed that the contents files FL1 to FL6 of the MP3 format are hierarchically stored in the USB memory 101, and the respective music contents files FL1 to FL6 have stored therein a title, an artist name, and an album name of the "ID3 tag" format as the tag data. The album name of the contents file FL3, the title name of the contents file FL5, and the artist name of the contents file FL6 are set blank (or not registered).

Firstly, the mechanical control unit 12 forms a title list file LST1 with the titles of the contents files FL set as the re-array conditions. Specifically, after forming the blank title list file LST1 on the RAM 12C in advance, the mechanical control unit 12 performs the hierarchy cyclic processing to identify the first contents file FL1, and reads out the leading four characters "TOMO" of the title from the tag data of the contents file FL1.

Figure 5A:
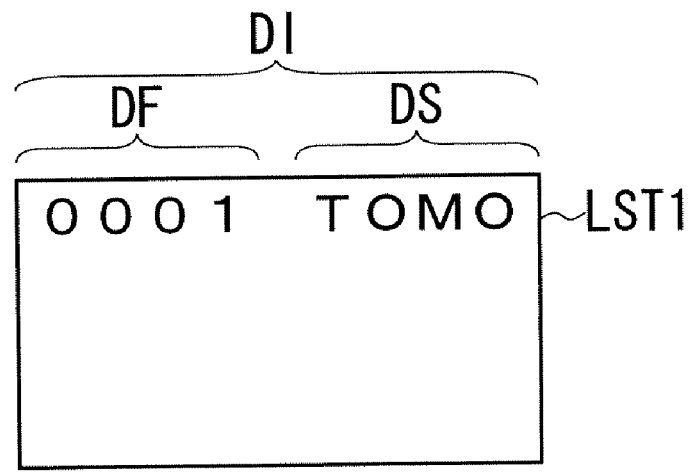
FIG. 5A to FIG. 5C show schematic views indicative of the configuration of a list file (1)

Next, as shown in FIG. 5A, the mechanical control unit 12 combines a digit sequence "0001" expressed with four digits to identify the contents file FL1 and the leading four characters "TOMO" of the title of the contents file FL1, and stores thus combined data in the title list file LST1. Hereinafter, the four-digit digit sequence is referred to as a file identifier DF, and the leading four-character character string of the title is referred to as a re-array identifier DS, and information that is obtained by combining the file identifier DF and the re-array identifier DS is referred to as an identification information DI.

The mechanical control unit 12 reduces the occupied area on the RAM 12C to the requisite minimum within a range in which the subsequent re-array processing can be sufficiently carried out by using not all the characters but only the leading four characters of the title. Moreover, so as to obtain the re-array result in which upper case characters and lower case characters are equated in the subsequent re-array processing, the mechanical control unit 12 converts all the leading four characters of the title to those composed of upper case characters.

Since the mechanical control unit 12 sets the recognition order of the contents file FL which is uniquely determined by the hierarchy cyclic processing to the file identifier DF, using the file identifier DF being only the four-digit digit sequence, the respective contents files FL can be correctly recognized without fail with the occupied area on the RAM 12C reduced.

Based on the assumption that the number of the contents files FL stored in the USB memory 101 is approximately several thousands pieces at most, the mechanical control unit 12 expresses the file identifier DF using the four-digit digit sequence.

When identification information DI1 of music contents CT1 is stored in the title list file LST1 on the RAM 12C, the mechanical control unit 12 writes (copies) the title list file LST1 to the root folder FD1 of the USB memory 101.

Next, the mechanical control unit 12 identifies the second contents file FL2 by performing the hierarchy cyclic processing, and reads out the leading four characters "I WA" of the title from the tag data of the contents file FL2. Then, the mechanical control unit 12 generates identification information DI2 of the contents file FL2 by making the leading four characters "I WA" of the title of the contents file FL2 correspond to a four-digit digit sequence "0002" to identify the contents file FL2.

Figure 5B:
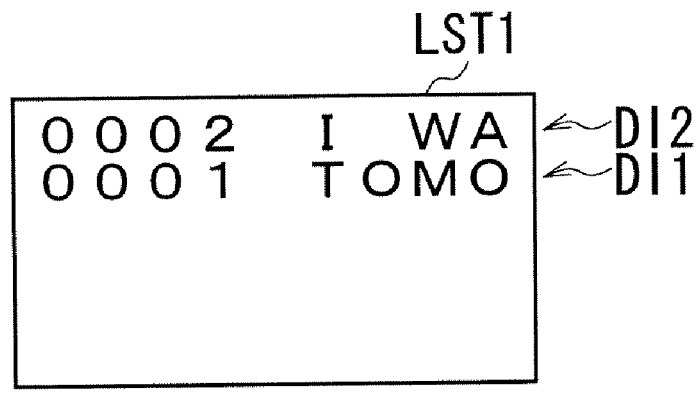

Furthermore, the mechanical control unit 12 compares a re-array identifier DS2 of the identification information DI2 with a re-array identifier DS1 of the identification information DI1, and, as shown in FIG. 5B, re-arrays the identification information DI within the title list file LST1 on the RAM 12C such that these re-array identifiers DS are-arrayed in ascending order, and writes (overwrites) the title list file LST1 to the root folder FD1 of the USB memory 101.

That is, the mechanical control unit 12 adds the identification information DI to the title list file LST1 on the RAM 12C and concurrently re-arrays the identification information DI, and further copies the title list file LST1 to the USB memory 101.

The mechanical control unit 12 compares the re-array identifiers DS1 and DS2 character by character, and re-arrays the re-array identifiers in ascending order of an American Standard Code for Information Interchange (ASCII) code. In case the title of the contents file FL is blank, the mechanical control unit 12 adds the identification information DI of the contents file FL to the end of the title list file LST1.

The mechanical control unit 12 repeats, with respect to the contents files FL3 to FL6, a series of processing of identifying the contents file FL by carrying out the hierarchy cyclic processing, and generating the identification information DI which is obtained by combining the file identifier DF being the four-digit digit sequence and the re-array identifier DS being the leading four-character character string of the title, and adding the identification information DI to the title list file LST1 such that the respective re-array identifiers DS are-arrayed in ascending order.

Figure 5C:
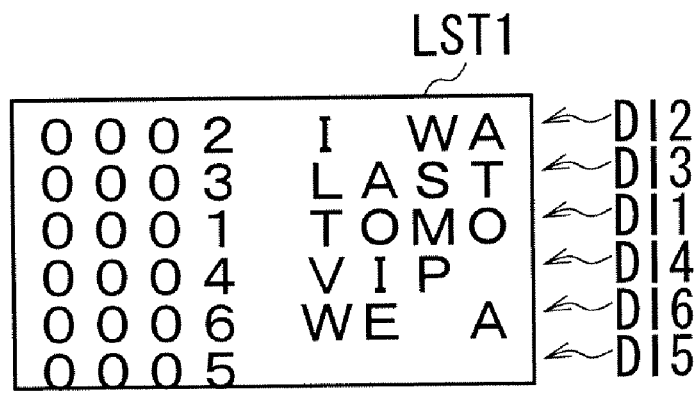

As a result, as shown in FIG. 5C, the mechanical control unit 12 can form the title list file LST1 in which identification information DI1 to DI6 are re-arrayed such that the re-array identifiers DS1 and DS6 are-arrayed in ascending order, and store the title list file LST1 in the root folder FD1 of the USB memory 101.

The title list file LST1 represents that, as the result of re-arraying all the contents files FL1 to FL6 with the titles set as the re-array conditions, the identification information is arrayed in the order of the identification information DI1 to DI6 in the title list file LST1, that is, the contents files are-arrayed in the order of the contents files FL2, FL3, FL1, FL4, FL6, and FL5.

Furthermore, by performing the similar processing, the mechanical control unit 12 forms an artist list file LST2 shown in FIG. 6A that is obtained with the artist names of the contents files FL set as the re-array conditions, and an album list file LST3 shown in FIG. 6B that is obtained with the album names of the contents files FL set as the re-array conditions, respectively, and stores thus formed list files in the root folder FD1 of the USB memory 101.

In this way, by using the identification information DI that is obtained by combining the file identifier DF and the re-array identifier DS of the contents file FL, the mechanical control unit 12 carries out the re-array processing on the PAM 12C whose storage capacity is limited. As a result, the mechanical control unit 12 can form the respective title list file LST1, artist list file LST2, and album list file LST3 (referred to as list files LST, hereinafter), and store the respective list files LST in the USB memory 101 being an external storage medium.

In case it is determined that there is no sufficient free area to store the list files LST in the USB memory 101, or in case writing files to the USB memory 101 is prohibited, the mechanical control unit 12 is so configured as not to carry out the processing of forming the successive list files LST.

Furthermore, in writing thus formed list files LST to the USB memory 101, the mechanical control unit 12 writes ID, not shown, peculiar to the audio reproduction apparatus 1 to the head thereof.

In case the list files LST have already been stored in the USB memory 101, the mechanical control unit 12 judges whether or not the ID of the audio reproduction apparatus 1 is written in the list files LST, and whether or not the total number of the contents files FL in the list files LST accords with the total number of the contents files FL registered in the FAT entry data FED0.

In this case, in case the ID accords and the total numbers of the contents files FL accord, the mechanical control unit 12 determines that the list files LST are latest ones and does not re-form the list files LST, while in case the ID or the total numbers of the contents files FL do not accord, the mechanical control unit 12 re-forms the list files LST.

Furthermore, while the list files LST are being formed, the mechanical control unit 12 sequentially reproduces the contents files FL in the order registered in the FAT entry data FED0, which can soften the impression which a user is made to have.

(3-2) Reproducing Contents Files

The audio reproduction apparatus 1 has, with respect to the contents files FL in the USB memory 101, four kinds of reproduction modes or "standard reproduction mode", "title order reproduction mode", "artist order reproduction mode", and "album order reproduction mode".

The "standard reproduction mode" is the mode that reproduces the respective contents files FL in the order registered in the FAT entry data FED0 of the USB memory 101, and is inevitably selected in the state in which above-described list files LST are not formed.

The "title order reproduction mode" is the mode that reads out and reproduces the respective contents files FL in accordance with the title list file LST1 shown in FIG. 5C. Similarly, the "artist order reproduction mode" and the "album order reproduction mode" are the modes which reads out and reproduces the respective contents files FL in accordance with the artist list file LST2 shown in FIG. 6A and the album list file LST3 shown in FIG. 6B, respectively.

Actually, the master control unit 10 of the audio reproduction apparatus 1 is so configured as to sequentially switch these reproduction modes every time a mode button 11M of the manual operation button group 11 shown in FIG. 2 is pressed by a user. In case there exist reproduction modes in which the list files LST are not formed, the master control unit 10 skips and does not select the reproduction modes.

Next, in case the reproduction mode other than the standard reproduction mode is selected, the master control unit 10 reads in the list file LST corresponding to the selected reproduction mode from the USB memory 101.

In case the standard reproduction mode is selected, the master control unit 10 makes the mechanical control unit 12 read out and sequentially reproduce the respective contents files FL in the order registered in the FAT entry data FED0. On the other hand, in case the reproduction mode other than the standard reproduction mode is selected, the master control unit 10 makes the mechanical control unit 12 read out and sequentially reproduce the respective contents files FL in the order conforming to the list file LST.

In this way, the master control unit 10 of the audio reproduction apparatus 1 is so configured as to read out and sequentially reproduce the contents files FL from the USB memory 101 in the order corresponding to the reproduction mode selected by a user.

(3-3) Deleting List File

The mechanical control unit 12 of the audio reproduction apparatus 1 is so configured as to delete the list files LST when the USB memory 101 is separated to be removed.

Specifically, when receiving an operational designation to separate the USB memory 101 from a user, the audio reproduction apparatus 1 notifies a designation from the master control unit 10 to the mechanical control unit 12. Accordingly, the mechanical control unit 12 deletes the list files LST stored in the root folder FD1 of the USB memory 101.

In this way, since the audio reproduction apparatus 1 can automatically delete the list files LST which come to be unnecessary files when the USB memory 101 is connected to other personal computers, the storage capacity of the USB memory 101 is not wastefully consumed.

Also when receiving an operational designation to turn off power from a user, the audio reproduction apparatus 1 deletes the list files LST stored in the root folder FD1 of the USB memory 101.

In this way, even if the USB memory 101 is removed to be connected to other computers etc. after the power is turned off, the audio reproduction apparatus 1 can be prevented from leaving the list files LST being unnecessary files.

(4) Processing Related to List File (4-1) Processing of Forming List File

Next, list file forming processing procedure RT1 that is executed when the mechanical control unit 12 of the audio reproduction apparatus 1 forms the list files LST will be explained referring to a flowchart shown in FIG. 7. Hereinafter, an example of forming the title list file LST1 will be explained.

When it is recognized that the USB memory 101 is connected to the USB connector 17 shown in FIG. 1, the mechanical control unit 12 starts the list file forming processing procedure RT1 by reading out a list file forming program from the ROM 12B to execute thus read out program, going to step SP1.

In step SP1, the mechanical control unit 12 reads in the FAT entry data FED0 from the USB memory 101, and recognizes the total number NA of the registered contents files FL, going to next step SP2.

In step SP2, working cooperatively with the master control unit 10, the mechanical control unit 12 transfers to the standard reproduction mode to start reproducing the contents files FL in the order registered in the FAT entry data FED0, going to next step SP3.

In step SP3, the mechanical control unit 12 judges whether or not the title list file LST1 has already been stored in the USB memory 101. In case a positive result is obtained, the mechanical control unit 12 goes to next step SP4.

In step SP4, the mechanical control unit 12 judges whether or not ID of the audio reproduction apparatus 1 is written in the head of the title list file LST1 that has already been formed. In case a negative result is obtained, this expresses that the possibility that the title list file LST1 which has already been formed is not formed by the mechanical control unit 12 is high, and the mechanical control unit 12 goes to step SP7 so as to re-form the title list file LST1.

On the other hand, in case a positive result is obtained in step SP4, this expresses that a possibility that the title list file LST1 which has been stored is correctly formed by the mechanical control unit 12 is high, and the mechanical control unit 12 goes to next step SP5.

In step SP5, the mechanical control unit 12 opens the title list file LST1, and checks registration number ND of the registered identification information DI, going to next step SP6.

In step SP6, the mechanical control unit 12 judges whether or not the registration number ND of the identification information DI accords with the total number NA of the contents files FL. In case a negative result is obtained, this expresses that a new contents file FL is stored in the USB memory 101 after the title list file LST1 is formed, and that a possibility that the title list file LST1 does not match to the actual condition is high, and the mechanical control unit 12 goes to step SP7 so as to re-form the list files LST.

On the other hand, in case a positive result is obtained in step SP6, it can be considered that the latest state of the contents file FL stored in the USB memory 101 is reflected to the title list file LST1, and this expresses that there is no necessity to form the title list file LST1, and the mechanical control unit 12 goes to step SP16 to end the list file forming processing procedure RT1.

On the other hand, in case a negative result is obtained in step SP3, this expresses that the title list file LST1 has to be formed, and the mechanical control unit 12 goes to next step SP7.

In step SP7, as prior confirmation before forming the title list file LST1, the mechanical control unit 12 judges whether or not there is free area to store the title list file LST1 in the USB memory 101 based on the contents registered in the FAT entry data FED0. In case a negative result is obtained, this expresses that, even if the title list file LST1 is formed, there is no area to store thus formed title list file LST1, and the mechanical control unit 12 goes to step SP16 to end the list file forming processing procedure RT1.

On the other hand, in case a positive result is obtained in step SP7, this expresses that there is area to store the title list file LST1, and the mechanical control unit 12 goes to next step SP8 so as to start forming the title list file LST1.

In step SP8, the mechanical control unit 12 initializes the title list file LST1 on the RAM 12C, going to next step SP9.

In step SP9, the mechanical control unit 12 sets file number "n" to express the contents file FL by the hierarchy cyclic order to the initial value "1", going to next step SP10.

In step SP10, the mechanical control unit 12 opens a contents file FLn whose hierarchy cyclic order is "n", going to next step SP11.

Figure 8:
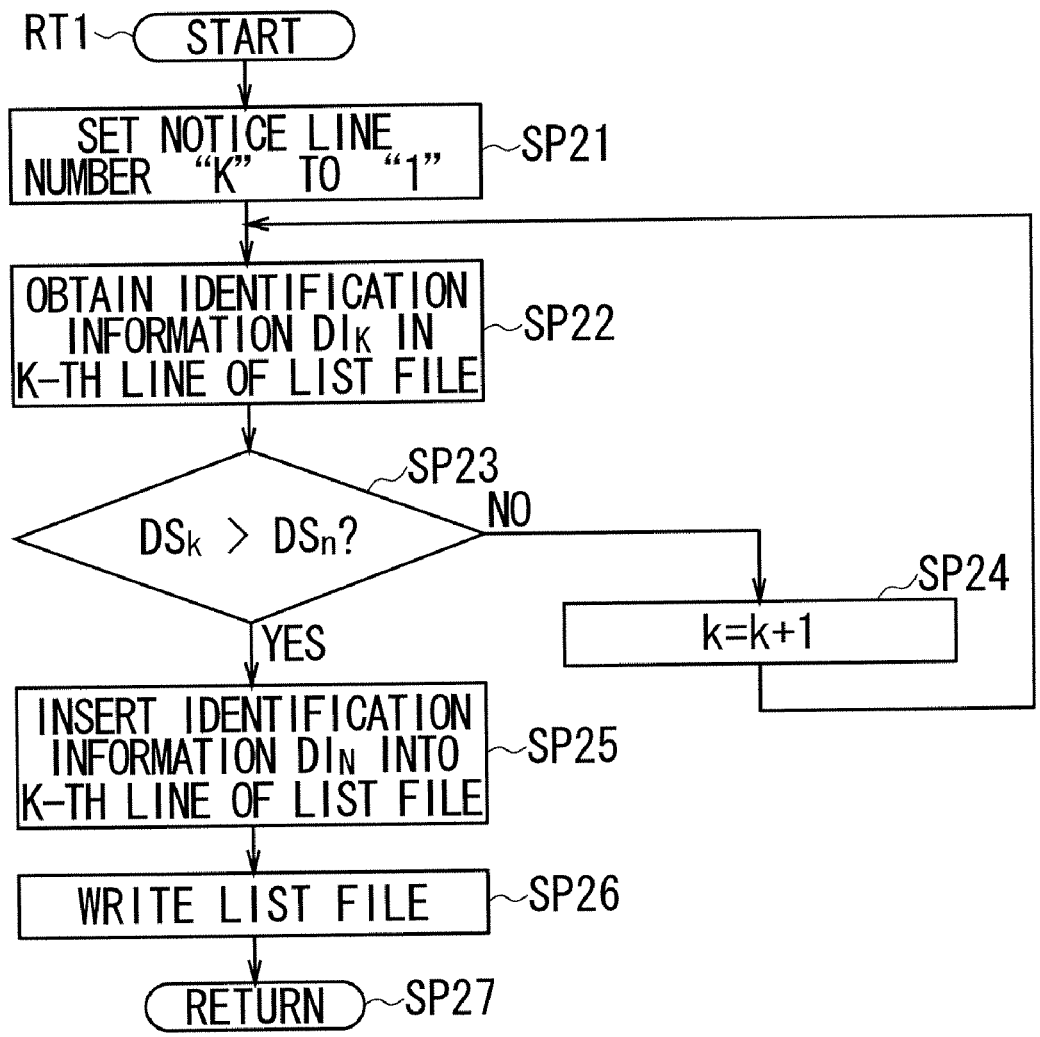
FIG. 8 shows a flowchart indicative of identification information addition processing procedure.

In step SP11, the mechanical control unit 12 generates identification information DIn by combining a file identifier DFn that is obtained by expressing the file number "n" using a digit sequence with four digits and a re-array identifier DSn that is obtained by extracting leading four characters of the title from the tag data of the contents file FLn, going to identification information addition subroutine RT2 shown in FIG. 8.

When the identification information addition subroutine RT2 is started, firstly, the mechanical control unit 12 goes to step SP21 to set notice line number "k" to specify the identification information DI of the title list file LST1 to the initial value "1", going to next step SP22.

In step SP22, the mechanical control unit 12 obtains identification information DIk that is registered in the k-th line of the title list file LST1, going to next step SP23.

In step SP23, the mechanical control unit 12 judges whether or not a re-array identifier DSk of the noticed identification information DIk is larger than the re-array identifier DSn of the identification information DIn that is desired to be newly stored. In case a negative result is obtained, this expresses that, even if the identification information DIn is inserted into the k-th line, the titles are not arrayed in ascending order, and the mechanical control unit 12 goes to next step SP24.

In step SP24, the mechanical control unit 12 adds a value "1" to the notice line number "k" so as to change the noticed identification information DI, returning to step SP22 again.

On the other hand, in case a positive result is obtained in step SP22, this expresses that, when the identification information DIn is inserted into the k-th line, the titles are-arrayed in ascending order, and the title list file LST1 can be correctly configured, and the mechanical control unit 12 goes to next step SP25.

In step SP25, the mechanical control unit 12 inserts the identification information DIn into the k-th line of the title list file LST1 on the RAM 12C, going to next step SP26.

Figure 7:
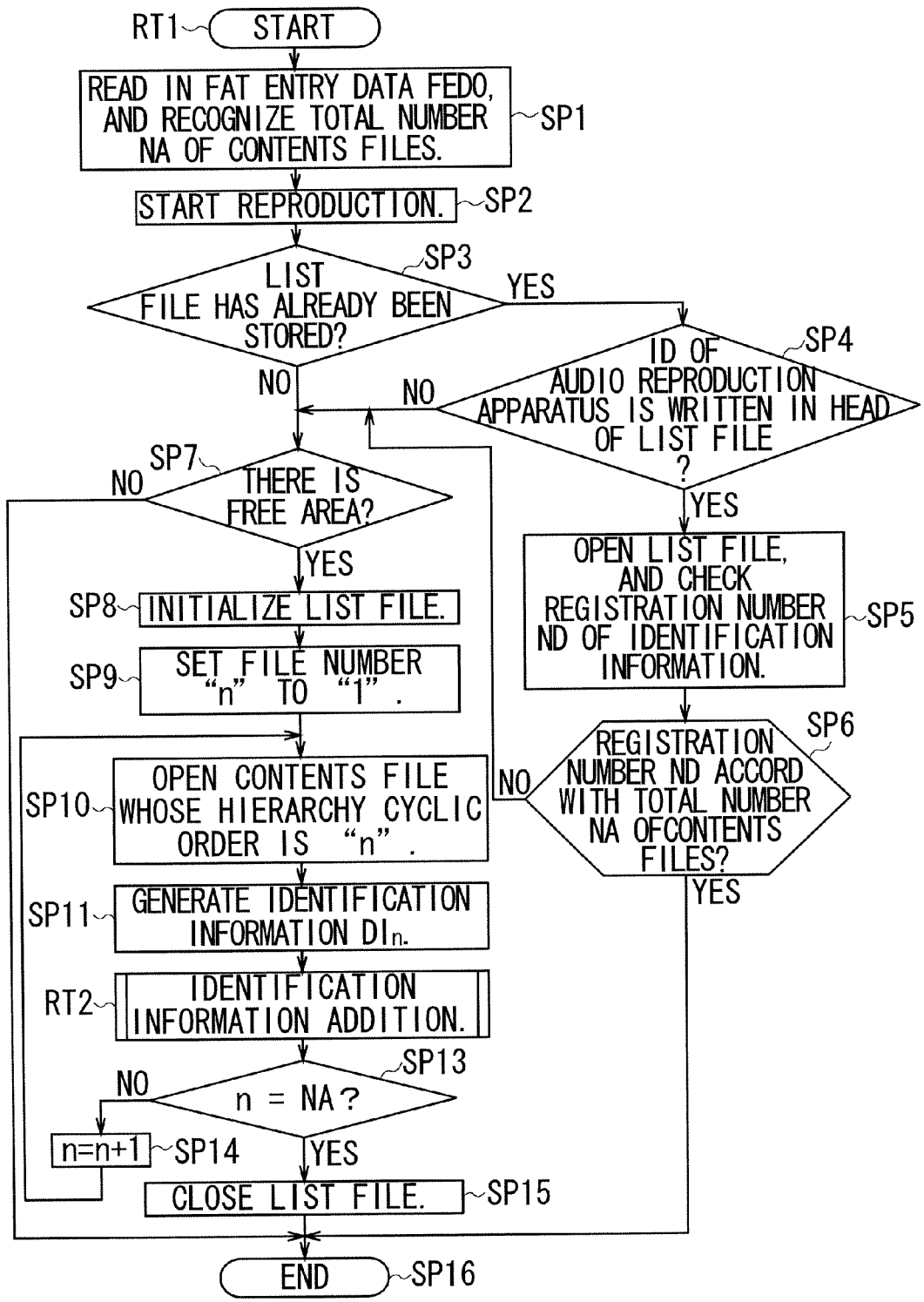
FIG. 7 shows a flowchart indicative of list file forming processing procedure.

In step SP26, after writing the title list file LST1 to the root folder FD1 of the USB memory 101, the mechanical control unit 12 goes to next step SP27 to return to the original list file forming processing procedure RT1 shown in FIG. 7, going to next step SP13.

In step SP13, the mechanical control unit 12 judges whether or not the file number "n" is equal to the total number NA of the contents files FL registered in the FAT entry data FED0. In case a negative result is obtained, this expresses that contents files FL whose identification information DI has not been registered yet remain in the USB memory 101, and the mechanical control unit 12 adds a value "1" to the file number "n", and returns to step SP10 again so as to add identification information DI of the next contents file FL to the title list file LST1.

On the other hand, in case a positive result is obtained in step SP13, this expresses that registering identification information DI has been completed with respect to all the contents files FL in the USB memory 101, and the mechanical control unit 12 goes to next step SP15.

In step SP15, after closing the opened title list file LST1, the mechanical control unit 12 goes to next step SP16 to end the list file forming processing procedure RT1.

(4-2) Processing of Switching Reproduction Mode

Figure 9:
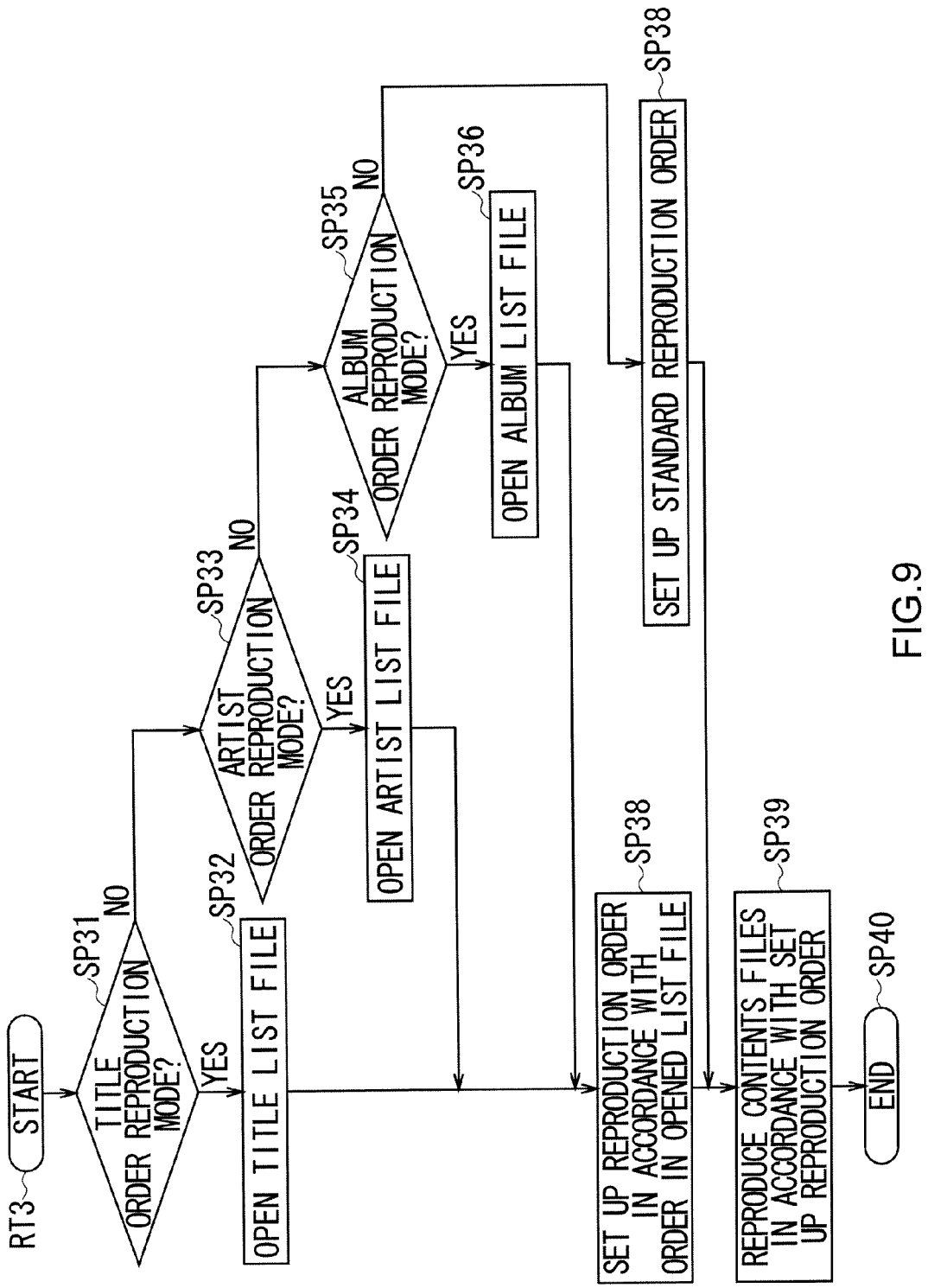
FIG. 9 shows a flowchart indicative of reproduction mode switching processing procedure.

Next, reproduction mode switching processing procedure RT3 that is executed when the mechanical control unit 12, working cooperatively with the master control unit 10, switches the reproduction mode and reproduces the contents file FL will be explained referring to a flowchart shown in FIG. 9.

When receiving notification that the mode button 11M of the manual operation button group 11 shown in FIG. 2 is pressed from the master control unit 10, the mechanical control unit 12 starts reading out and executing a reproduction mode switching program from the ROM 12B, going to step SP31.

In step SP31, the mechanical control unit 12 judges whether or not the reproduction mode after switching is the title order reproduction mode. In case a positive result is obtained, the mechanical control unit 12 goes to next step SP32 to open the title list file LST1 stored in the root folder FD1 of the USB memory 101, going to next step SP37.

On the other hand, in case a negative result is obtained in step SP31, the mechanical control unit 12 goes to step SP33.

In step SP33, the mechanical control unit 12 judges whether or not the reproduction mode after switching is the artist order reproduction mode. In case a positive result is obtained, the mechanical control unit 12 goes to next step SP34 to open the artist list file LST2 stored in the root folder FD1 of the USB memory 101, going to next step SP37.

On the other hand, in case a negative result is obtained in step SP33, the mechanical control unit 12 goes to step SP35.

In step SP35, the mechanical control unit 12 judges whether or not the reproduction mode after switching is the album order reproduction mode. In case a positive result is obtained, the mechanical control unit 12 goes to next step SP36 to open the album list file LST3 stored in the root folder FD1 of the USB memory 101, going to next step SP37.

In step SP37, the mechanical control unit 12 sets up the reproduction order of the contents files FL in accordance with the reproduction order in the currently opened list file LST, that is, write-down order of the identification information DI, going to next step SP39.

On the other hand, in case a negative result is obtained in step SP35, this expresses that the reproduction mode after switching is the standard reproduction mode, and the mechanical control unit 12 goes to next step SP38.

In step SP38, the mechanical control unit 12 sets up the reproduction order of the contents files FL in accordance with the order registered in the FAT entry data FED0, going to next step SP39.

In step SP39, the mechanical control unit 12 sequentially reads out and reproduces the contents files FL from the USB memory 101 in accordance with the set up reproduction order, then going to step SP40 to end the reproduction mode switching processing procedure RT3.

(4-3) Processing of Deleting List File

Figure 10:
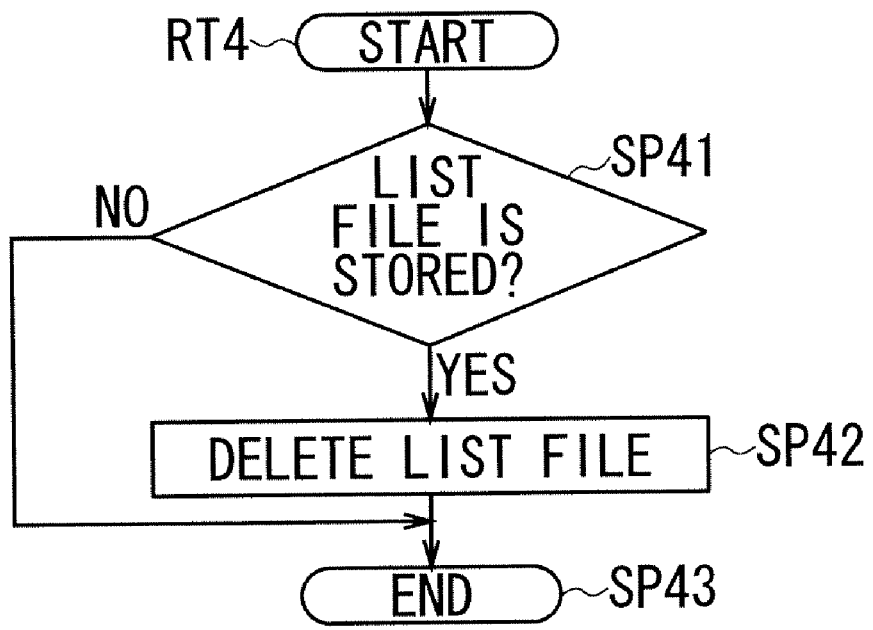
FIG. 10 shows a flowchart indicative of list file deleting processing procedure.

Next, list file deleting processing procedure RT4 that is executed when the mechanical control unit 12 deletes the list file LST will be explained referring to a flowchart shown in FIG. 10.

Due to the notification from the master control unit 10, when recognizing that a designation to separate the USB memory 101 from the user is accepted, the mechanical control unit 12 starts the list file deleting processing procedure RT4 by reading out a list file deleting program from the ROM 12B shown in FIG. 1 to execute thus read out program, going to step SP41.

In step SP41, the mechanical control unit 12 judges whether or not the list file LST is stored by examining the root folder FD1 of the USB memory 101. In case the positive result is obtained, the mechanical control unit 12 goes to next step SP42.

In step SP42, the mechanical control unit 12 deletes the list file LST from the root folder FD1 of the USB memory 101, then going to next step SP43 to end the list file deleting processing procedure RT4.

On the other hand, in case a negative result is obtained in step SP41, this expresses that it is unnecessary to perform the deleting processing since the list file LST is not stored in the root folder FD1 because the USB memory 101 is in the write-inhibit state etc, and the mechanical control unit 12 goes to step SP43 to end the list file deleting processing procedure RT4.

(4-4) Processing of Turning Off Power

Figure 11:
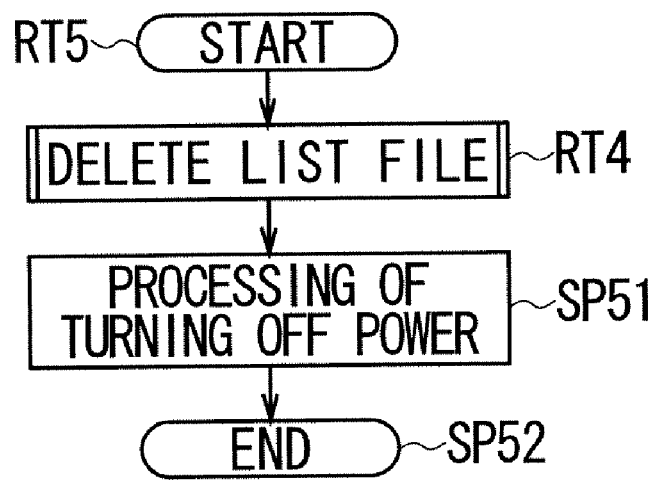
FIG. 11 shows a flowchart indicative of power turning-off processing procedure.

Next, power turning-off processing procedure RT5 that is executed when the audio reproduction apparatus 1 receives a designation to turn off power, and the mechanical control unit 12 deletes the list file LST will be explained referring to a flowchart shown in FIG. 11.

Due to the notification from the master control unit 10, when recognizing that a designation to turn off power of the audio reproduction apparatus 1 from a user is accepted, the mechanical control unit 12 starts the power turning-off processing procedure RT5 by reading out a power turning-off program from the ROM 12B shown in FIG. 1 to execute thus read out program, going to routine RT4.

After deleting the list file LST by performing above-described list file deleting processing procedure RT4, the mechanical control unit 12 goes to SP51.

After performing the processing of turning off power such as shutting off supplying power to the USB memory 101 in step SP51, the mechanical control unit 12 goes to next SP52 to end the power turning-off processing procedure RT5.

(5) Performance and Effect

In above-described configuration, when the USB memory 101 is connected to the USB connector 17, for each contents file FL, the mechanical control unit 12 of the audio reproduction apparatus 1 generates the identification information DI to identify the contents file FL by combining the file identifier DF being a digit sequence that represents the hierarchy cyclic order of the contents file FL and the re-array identifier DS being a character string that is extracted from the tag data of the contents file FL, and sequentially registers the identification information DI in the list file LST such that the re-array identifiers DS are-arrayed in ascending order, and stores the list file LST in the USB memory 101.

Then, when the reproduction mode is switched since the mode button 11M is pressed, working cooperatively with the master control unit 10, the mechanical control unit 12 reads out the list file LST corresponding to thus switched reproduction mode from the USB memory 101, and sequentially reproduces the contents files FL in the reproduction order conforming to the registration order of the identification information DI in the list file LST.

Accordingly, even if a sufficient capacity to store the list file LST is not provided on the RAM 12C, by utilizing the USB memory 101 as area to store the list file LST, the mechanical control unit 12 of the audio reproduction apparatus 1 can sequentially reproduce the contents files FL in the reproduction order conforming to the list file LST.

At this time, by identifying the contents file FL using the file identifier DF being a four-digit digit sequence in the list file LST, the mechanical control unit 12 can reduce the size of the respective identification information DI and list file LST, which can form the list file LST on the RAM 12C of small capacity.

Particularly, as compared with a case in which a general path name, a file name, etc. (approximately 8 to 50 characters) are set to the file identifier DF, the mechanical control unit 12 can significantly reduce a size of the respective identification information DI.

Furthermore, since a digit sequence based on the hierarchy cyclic order that uniquely determines the recognition order of the contents files FL in the hierarchical folder structure is set to the file identifier DF, the mechanical control unit 12 can be surely identify a specific contents file FL using the file identifier DF.

Moreover, by setting the leading four characters of the tag data to the re-array identifier DS, the mechanical control unit 12 can perform the sufficient re-array processing with the size of the identification information DI reduced.

Moreover, by utilizing the USB memory 101 that is expected to have a sufficiently large free area as compared with a file size of the list file LST, the mechanical control unit 12 can store plural kinds of list files LST, and the list files LST can be switched to be used, which is difficult when using only the RAM 12C in storage capacity.

Moreover, by previously forming the list files LST, the mechanical control unit 12 uses the list files LST not only to set up the reproduction order of the contents files FL but also, in case a user wants to select a specific contents file FL based on a title name, to sequentially display the titles of the contents files FL on the display unit 16 shown in FIG. 1 based on the registration order of the title list file LST1, improving the retrieval performance for the contents files FL.

According to above-described configuration, for each contents file FL, by generating the identification information DI which is obtained by combining the file identifier DF being a digit sequence that represents the hierarchy cyclic order of the contents file FL and the re-array identifier DS being a character string that is extracted from the tag data of the contents file FL, and sequentially registering the identification information DI in the list file LST such that the re-array identifiers DS are-arrayed in ascending order to store the list file LST in the USB memory 101, the mechanical control unit 12 of the audio reproduction apparatus 1 can read out and utilize the list file LST from the USB memory 101, and sequentially reproduce the contents files FL in the reproduction order conforming to the registration order of the identification information DI in the list file LST.

(6) Other Embodiments

In the above-described embodiments, the contents files FL stored in the USB memory 101 are music contents files of the MP3 format, to which the present invention is not restricted, and various formats or a WMA format, an AAC format, or an ATRAC format, etc. may be employed for the contents files FL.

In this case, titles, artist names, etc. are read out from an ASF of a WMA format, Info data, metadata of an AAC format, header data of an ATRAC format, etc. as the tag data to be set to additional data. Moreover, the file format is not restricted to a single kind, and, in case plural kinds of files are mixedly stored in the USB memory 101, the re-array processing may be carried out based on titles, artist names, etc. irrespective of the file formats.

Furthermore, in above-described embodiments, the re-array identifiers DS are generated to form the list files LST with titles, artist names, or album names of the contents files FL set as the re-array conditions, to which the present invention is not restricted, and the re-array identifiers DS may be generated to form the list files LST with various articles or release year-month-days, musical composers, musical performance time periods, etc. set as the re-array conditions.

Furthermore, in above-described embodiments, the identification information DI is generated using the file identifier DF being a four-digit digit sequence representing the hierarchy cyclic order, to which the present invention is not restricted, and the identification information DI may be generated using a file identifier DF being a digit sequence of three-digit or lower or a digit sequence of five-digit or higher, and it is necessary to exceed a number of the contents files FL stored in the USB memory 101. Moreover, the file identifier DF may be expressed by a character string or a hexadecimal digit (that is, binary data) instead of a digit sequence, and, in this case, it is expected that a number of characters can be reduced as compared with the case of using a digit sequence. In case a hexadecimal digit is used as the file identifier DF, values of $2^{16}=65536$ ways can be expressed by 2 bytes.

Furthermore, in above-described embodiments, the respective contents files FL are identified based on the order of recognizing the respective contents files FL (hierarchy cyclic order) when the hierarchy cyclic processing is performed, to which the present invention is not restricted, and the respective contents files FL may be identified in a unique order by other methods other than the hierarchy cyclic processing to identify the respective contents files FL based on the order.

Furthermore, in above-described embodiments, the identification information DI is generated using the re-array identifier DS being the leading four-character character string of metadata, to which the present invention is not restricted, and the identification information DI may be generated using leading three characters or less, or leading five characters or more of metadata. In this case, taking a possibility that the re-array identifiers DS are overlapped according to a number of the contents files FL stored in the USB memory 101 into consideration, a number of characters is set up such that the respective contents files FL can be sufficiently differentiated.

Furthermore, in above-described embodiments, when re-arraying the identification information DI in forming the list files LST, the re-array identifiers DS are compared character by character, and the identification information DI is re-arrayed in ascending order of the ASCII code, to which the present invention is not restricted, and the identification information DI may be re-arrayed in descending order of the ASCII code. Moreover, the character code of the tag data is not restricted to the ASCII code, and may be a Shift-Japan Industrial Standard (JIS) code, a Uniform Text Format (UTF) code, an International Organization for Standardization (ISO) 8859-1 code, etc.

Moreover, in case the contents files FL whose character codes of the tag data are different from each other are stored in the USB memory 101, after converting the respective tag data to a single kind of character code (for example, UTF16) etc., the re-array identifiers DS are compared character by character to re-array the identification information DI.

Furthermore, in above-described embodiments, the title list file LST1, the artist list file LST2, and the album list file LST3 are respectively formed by repeating the list file forming processing procedure RT1 three times with the re-array conditions changed, to which the present invention is not restricted, and, in case the capacity of the RAM 12C of the mechanical control unit 12 is sufficient, the title list file LST1, artist list file LST2, and album list file LST3 may be formed in parallel by executing the identification information addition subroutine RT2 in parallel.

Furthermore, in above-described embodiments, thus formed list files LST are deleted at the time of separating the USB memory 101 or turning off power of the audio reproduction apparatus 1, to which the present invention is not restricted, and, inquiring a user whether or not the list files LST should be deleted, and the list files LST may be made to remain in case of receiving a designation of not deleting the list files LST.

Furthermore, in above-described embodiments, the audio reproduction apparatus 1 is a vehicle audio apparatus loaded on a vehicle, to which the present invention is not restricted, and the audio reproduction apparatus 1 may be a household audio apparatus, a handheld portable audio player, etc.

Furthermore, in above-described embodiments, the present invention is applied to the audio reproduction apparatus 1 that reproduces the contents files FL being music contents, to which the present invention is not restricted, and the present invention may be applied to a reproduction apparatus that reproduces various contents, for example, a video reproduction apparatus that reproduces the contents files FL being image contents or still picture contents.

Furthermore, in above-described embodiments, when the USB memory 101 as an external storage device is connected to the USB connector 17, the list files LST of the contents files FL stored in the USB memory 101 are formed, to which the present invention is not restricted, and, for example, when a portable audio player that has loaded therein a hard disc drive and is provided with the USB interface is connected to the USB connector 17, the list files LST of the contents files FL stored in the hard disc drive of the portable audio player may be formed.

Moreover, in this case, the connection means between the external storage device and the audio reproduction apparatus 1 is not restricted to the USB interface, and the wired interface such as an Institute of Electrical and Electronics Engineers (IEEE) 1394 interface, the wireless LAN such as IEEE 802.11 a/b/g, or the wireless interface such as Bluetooth (registered trademark) may be used.

Furthermore, in above-described embodiments, various programs such as the list file forming program and reproduction mode switching program are stored in the ROM 12B, to which the present invention is not restricted, and various programs may be read out to be directly executed from a detachable storage medium such as a Compact Disc-Read only Memory (CD-ROM) medium, not shown, or a memory stick (registered trademark of Sony Corporation), not shown, or may be installed to the RAM 12C or a flash memory, not shown, to be executed. Moreover, various programs may be obtained through the USB connector 17, wireless LAN such as IEEE 802.11 a/b/g, or a broadcast wave to be executed.

Furthermore, in above-described embodiments, the audio reproduction apparatus 1 as the contents reproduction apparatus is configured by the mechanical control unit 12 as file identifier generation means, identification information generation means, and list forming means, and the mechanical control unit 12 and audio signal processing unit 13 as reproduction means, to which the present invention is not restricted, and the contents reproduction apparatus may be configured by file identifier generation means, identification information generation means, list forming means, and reproduction means, which are composed of various circuit configurations.

The present invention may be utilized in a contents player etc. that reproduces contents stored in an external storage device.

It should be understood by those skilled in the art that various modifications, combinations sub-combinations and alterations may occur depending on design requirements and other factors insofar as they are within the scope of the appended claims or the equivalents thereof.

What is claimed is:

1. A content reproduction apparatus comprising:
file identifier generation means for generating sequential file identifiers that uniquely identify a plurality of content files respectively which are hierarchically stored in an external storage device;
identification information generation means for generating an identifier for each of the respective content files, each identifier being generated based on a same predetermined number of leading characters of additional data describing content of the respective content file and a different one of the sequential file identifiers, the predetermined number of leading characters being less than the total number of characters of at least one of the additional data describing the contents of the content files, wherein the identifier of each of the respective content files includes the predetermined number of leading characters of the additional data describing the content of the respective content file, wherein the additional data includes at least one of a title, an artist, and an album of the corresponding content file;

list forming means for forming a list by reordering the identification information with the predetermined number of leading characters of the additional data set as a reordering condition; and reproduction means for reading out and reproducing the content files which are identified by the sequential file identifiers of the respective identification information from the external storage device in accordance with the order of the identification information in the list.

2. The content reproduction apparatus according to claim 1, wherein the file identifier generation means sets a hierarchy cyclic order in hierarchy cyclic processing in which the cyclic order with respect to the plural content files uniquely identifies the sequential file identifier.

3. The content reproduction apparatus according to claim 1, further comprising:

connection means for connecting to the external storage device, the external storage device being a portable storage device; and list storage means for storing the list in the external storage device.

4. The content reproduction apparatus according to claim 3, further comprising:

deleting means for deleting the list from the external storage device before being separated from the external storage device.

5. The content reproduction apparatus according to claim 4, wherein the deleting means deletes the list from the external storage device before the power is turned off.

6. The content reproduction apparatus according to claim 1, wherein the list forming means forms a plurality of lists with a plurality of kinds of the additional data set as the reordering conditions respectively, and the reproduction means reproduces the content files in the order conforming to the list which is selected by the user from among the plural lists.

7. The content reproduction apparatus according to claim 1, wherein the reproduction means reproduces the plural content files stored in the external storage device in a readable order while the list forming means forms the list.

8. The content reproduction apparatus according to claim 1, wherein the list forming means re-forms the list in case the number of the identification information contained in the list which has already been stored in the external storage device and the number of the content files which are actually stored in the external storage device are different.

9. The content reproduction apparatus according to claim 1, wherein the list formed by the list forming means includes the sequential file identifier generated by the file identifier generation means and the identifier generated by the identification information generation means in association with each of the respective content files.

10. The content reproduction apparatus according to claim 1, wherein the identification information generation means generates a plurality of identifiers for each of the respective content files, each of the plurality of identifiers being based on different additional data describing the content of the respective content file.

11. A content reproduction method of an information processing apparatus comprising:

a file identifier generation step of generating sequential file identifiers that uniquely identify a plurality of content files respectively which are hierarchically stored in an external storage device;

an identification information generation step of generating, by the information processing apparatus, an identifier for each of the respective content files, each identifier being generated based on a same predetermined number of leading characters of additional data describing content of the respective content file and a different one of the sequential file identifiers, the predetermined number of leading characters being less than the total number of characters of at least one of the additional data describing the contents of the content files, wherein the identifier of each of the respective content files includes the predetermined number of leading characters of the additional data describing the content of the respective content file, wherein the additional data includes at least one of a title, an artist, and an album of the corresponding content file;

a list forming step of forming a list by reordering the identification information with the predetermined number of leading characters of the additional data set as a reordering condition; and a reproduction step of reading out and reproducing the content files which are identified by the sequential file identifiers of the respective identification information from the external storage device in accordance with the order of the identification information in the list.

12. The content reproduction method according to claim 11, wherein the file identifier generation step sets a hierarchy cyclic order in hierarchy cyclic processing in which the cyclic order with respect to the plural content files uniquely identifies the sequential file identifier.

13. The content reproduction method according to claim 11, further comprising:

a list storage step of storing the list in the external storage device, the external storage device being a portable storage device configured to connect to a connection unit of the information processing apparatus.

14. The content reproduction method according to claim 13, further comprising:

a deleting step of deleting the list from the external storage device before being separated from the external storage device.

15. The content reproduction method according to claim 14, wherein the deleting step deletes the list from the external storage device before the power is turned off.

16. The content reproduction method according to claim 11, wherein the list forming step forms a plurality of lists with a plurality of kinds of the additional data set as the reordering conditions respectively, and the reproduction step reproduces the content files in the order conforming to the list which is selected by the user from among the plural lists.

17. The content reproduction method according to claim 11, wherein the reproduction step reproduces the plural content files stored in the external storage device in a readable order while the list forming step forms the list.

18. A content reproduction apparatus comprising: a file identifier generation unit that generates sequential file identifiers that uniquely identify a plurality of content files respectively which are hierarchically stored in an external storage device; an identification information generation unit that generates an identifier for each of the respective content files based on a same predetermined number of leading characters of additional data describing content of the content files and a different one of the sequential file identifiers, the predetermined number of leading characters being less than the total number of characters of at least one of the additional data describing the contents of the content files, wherein the identifier of each of the respective content files includes the predetermined number of leading characters of the additional data describing the content of the respective content file, wherein the additional data includes at least one of a title, an artist, and an album of the corresponding content file;

a list forming unit that forms a list by reordering the identification information with the predetermined number of leading characters of the additional data set as a reordering condition; and a reproduction unit that reads out and reproduces the content files which are identified by the sequential file identifiers of the respective identification information from the external storage device in accordance with the order of the identification information in the list.

19. The content reproduction apparatus according to claim 18, further comprising:

a connection unit configured to connect to the external storage device, the external storage device being a portable storage device; and a list storage unit configured to store the list in the external storage device.

* * * * *